(12) United States Patent
Han et al.

(10) Patent No.: US 12,489,973 B2
(45) Date of Patent: Dec. 2, 2025

(54) AUTOMATIC USER ADAPTIVE TRIGGERING

(71) Applicant: Intel Corporation, Santa Clara, CA (US)

(72) Inventors: Ke Han, Shanghai (CN); Shouwei Sun, Shanghai (CN); Hemin Han, Shanghai (CN); Liang Cheng, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 449 days.

(21) Appl. No.: 18/090,782

(22) Filed: Dec. 29, 2022

(65) Prior Publication Data

US 2024/0064399 A1 Feb. 22, 2024

(30) Foreign Application Priority Data

Aug. 19, 2022 (CN) .......................... 202210999217.2

(51) Int. Cl.
*H04N 23/667* (2023.01)
*G06F 30/27* (2020.01)
*G06V 40/16* (2022.01)

(52) U.S. Cl.
CPC ........... *H04N 23/667* (2023.01); *G06F 30/27* (2020.01); *G06V 40/166* (2022.01)

(58) Field of Classification Search
CPC .. H04N 23/667; H04N 23/611; H04N 23/651; G06F 30/27; G06F 1/3231; G06F 21/32; G06F 40/40; G06F 3/011; G06F 3/017; G06F 3/013; G06F 18/214; G06F 2203/011; G06F 18/22; G06F 18/24; G06F 18/2413; G06V 40/166; G06V 40/161; G06V 40/172; G06V 40/171; G06V 40/176; G06V 10/82; G06V 40/70; G06V 20/50; G06V 40/40; G06V 20/52; G06V 40/174; G06V 40/20; G06V 40/16; G06V 10/60; G06V 10/145; G06V 40/168; G06V 20/597; G06V 40/10; G06V 40/18; G06V 20/56; G06V 10/764; G06V 40/193; G06V 10/25; G06V 20/53; G06V 10/245; G06V 10/40; G06V 10/44; G06V 10/806; G06V 20/70;
(Continued)

(56) References Cited

U.S. PATENT DOCUMENTS

2009/0324010 A1* 12/2009 Hou .................. G06V 20/52
382/103
2012/0281129 A1* 11/2012 Wang .................. H04N 23/611
348/333.01

(Continued)

*Primary Examiner* — Nimesh Patel
(74) *Attorney, Agent, or Firm* — Banner & Witcoff, Ltd.

(57) ABSTRACT

The present disclosure relates to automatic user adaptive triggering, such as triggering of always-on vision. A camera may be activated based on a result of applying a set of sensor features to a logic model. A label for the set of sensor features may be determined based on whether a face is detected or a face is not detected in a first set of images captured by the camera. The labeled sensor data may be stored along with historical data. A user behavior model may be generated using a learning algorithm based on the labeled sensor data. The user model may be incrementally updated based on new training data. The user behavior model may be used for determining whether to the activate the camera based on a particular set of sensor features.

21 Claims, 6 Drawing Sheets

(58) Field of Classification Search
CPC ...... G06V 10/10; G06V 10/74; G06V 40/173; G06V 20/64; G06N 3/045; G06N 3/08; G06N 20/00; G06N 3/02; G06N 3/04; G06N 3/044; G06N 3/063; G06N 3/0464; G06N 3/048; G06N 3/049; G06N 3/082; G06N 20/10; G06N 3/0475; H04L 63/0861; H04L 63/108; H04L 2209/84; H04L 9/0866
See application file for complete search history.

(56) References Cited

U.S. PATENT DOCUMENTS

| | | | |
|---|---|---|---|
| 2013/0136304 A1* | 5/2013 | Anabuki | G06V 40/20 |
| | | | 382/103 |
| 2016/0127641 A1* | 5/2016 | Gove | H04N 23/611 |
| | | | 348/143 |
| 2016/0156838 A1* | 6/2016 | Cheng | H04N 23/90 |
| | | | 348/222.1 |
| 2019/0228210 A1* | 7/2019 | Liu | G06V 10/82 |
| 2021/0209388 A1* | 7/2021 | Ciftci | G06N 3/045 |
| 2021/0211590 A1* | 7/2021 | Harrison | G06T 5/50 |

* cited by examiner

AUTOMATIC USER ADAPTIVE TRIGGERING

CROSS-REFERENCE TO RELATED APPLICATIONS

The present application claims priority to Chinese Patent Application No. 202210999217.2, filed Aug. 19, 2022 entitled, "Automatic User Adaptive Triggering", the content of which is hereby incorporated by reference in its entirety and for all purposes.

TECHNICAL FIELD

The present disclosure pertains to automatic user adaptive triggering systems and methods and in particular to always-on vision.

BACKGROUND

Users of mobile computing devices such as laptops, tablets, and smartphones, may carry their device with them throughout the day between home, work, and other activities. Many modern mobile computing devices maintain some continuous type of background activity, periodically communicating over networks to update applications, retrieve messaging, updating device location, etc. Some mobile computing devices such as smartphone may include radio subsystems and associated software components that are continually active to allow the device to receive incoming calls and messages, and notify the user of the same. As a result, modern mobile computing devices are often never fully switched off to a zero-power consumption state, but rather are routinely charged while being kept in at least a partially powered state.

DETAILED DESCRIPTION

Figure 1:
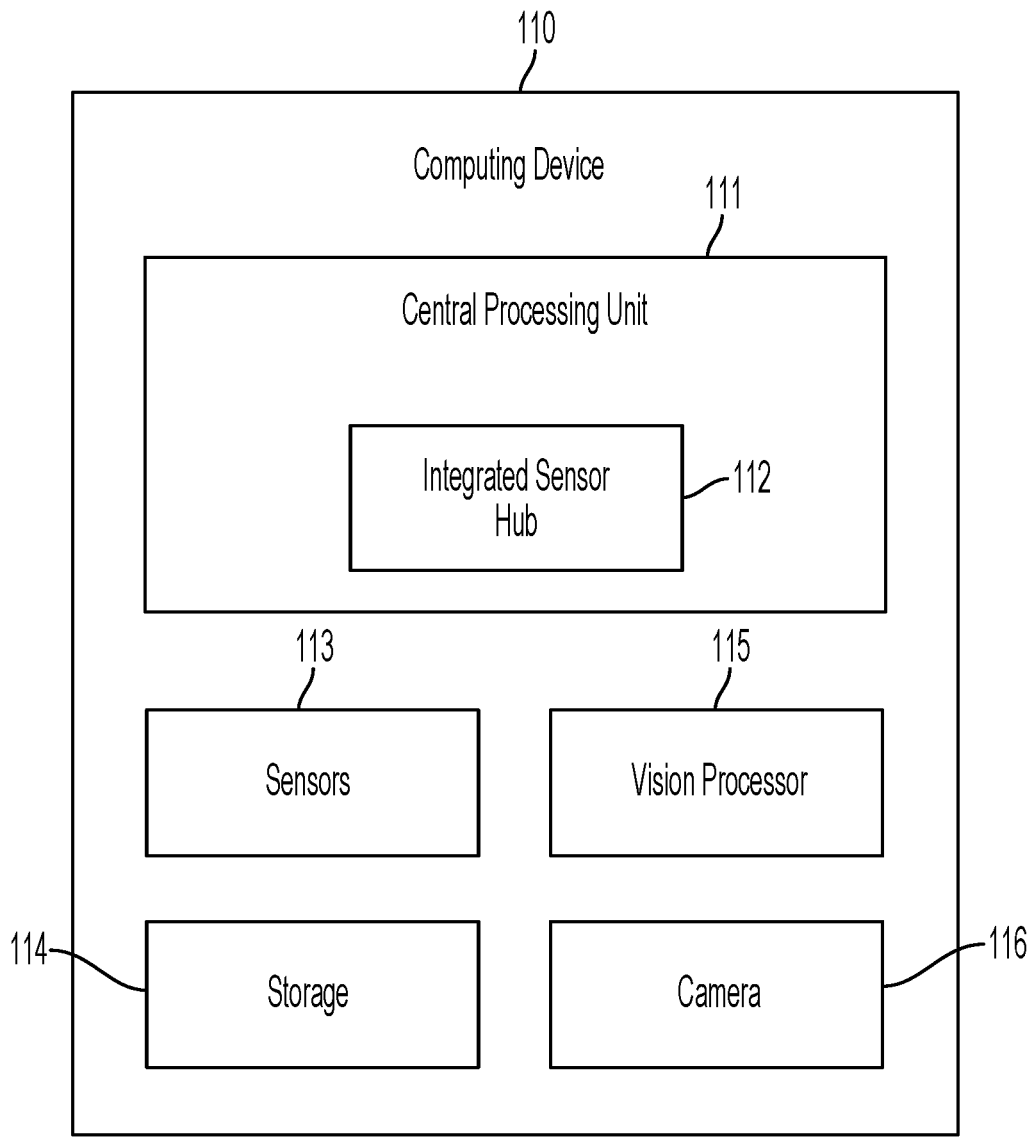
FIG. 1 shows a diagram of a computing device, according to an aspect of the present disclosure.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein.

As mentioned above, users of mobile computing devices such as laptops, tablets, and smartphones, may carry their device with them throughout the day between home, work, and other activities. Some users may desire their devices to be always ready for use without loading or wait time. However, keeping the computer system powered places a continuous drain on the battery beyond natural charge loss, necessitating routine charging. The battery may become fully drained and possibly result in the device shutting down if the user is unable to charge the device in a timely fashion.

Various possible solutions to address battery usage are possible, but present other disadvantages. Providing a larger capacity battery for the mobile computing device, while typically extending times between charges, may be undesirable as it increases the size, weight, and cost of the device. Alternatively or additionally, some computing devices may provide a low-power standby or sleep functionality to reduce battery consumption. In such a mode, often significant portions of such an equipped device are powered down, such as the display and associated circuitry, radios, and the device's processor, which may be placed into at least a partial sleep mode, with the processor state stored so that much of the processor's components may be powered down and later resumed without processing interruption. Some or all of the operating system state may be stored to flash storage that can retain information without power so that working memory, typically some form of DRAM that requires continuous power to maintain storage, may also be powered down. While putting the device in standby may increase battery life such that it lasts throughout the user's day, there may be an undesirable delay to load or wake up the computing device before it may be used, for example resulting from having to load the operating system state back into DRAM from flash storage and resume processor state.

An always-on vision system may be used to wake the computing device from a standby mode such that it is always-ready. "Always-on vision" generally refers to functionality that uses vision (e.g., a camera or imaging sensor) to detect the presence of a user (e.g., detect the face of a person) while the computing device is in a standby mode having reduced power consumption. Always-on vision may enable the following functionality for computing devices: "wake on approach," "walk away locking," "adaptive dimming" (e.g., dimming when a person's face is not facing the computing device). Such functionality is advantageous because it enables the computing device to be always-ready while also conserving battery life. "Always-ready" functionality may refer to the ability of the computer system to complete a waking process from a standby mode before the user uses the device, or within a short time period (e.g., less than one second, or less than three seconds).

While always-on vision may be performed while the computer system is in a standby mode, the camera may need to be active in order to perform face detection or other user detection algorithms based. However, keeping the camera active may use too much power to allow for the computing device to run for a workday (e.g., nine hours). Instead of keeping the camera active, one or more sensors having lower power consumption compared to the camera may be used to trigger and activate the camera. For instance, a vision processor chip of the computing device may use be configured to perform motion detection based on sensor data. The vision processor chip may be a discrete companion chip of a central processing unit (CPU) of the computing device, for example. The CPU may include a sensor hub, for example. The sensor hub may comprise a microcontroller unit, co-processor, or digital signal processor. The sensor hub may integrate data from one or more different sensors providing sensor data. The sensor hub may process the data and provide it to the vision processor chip.

The power consumption for different components of an exemplary always-on vision system are provided in Table 1 below.

TABLE 1

| Component | Average Power |
| --- | --- |
| Camera - Standby | 2 mW |
| Camera - Active | 10 mW |
| Vision Processor - Motion Detect | 10 mW |
| Vision Processor - Face Detect | 25 mW |

As shown in Table 1, actively operating the camera may use 10 mW and operating the vision processor to perform motion detection may use 10 mW. Accordingly, 20 mW may be required to perform always-on vision functionality using motion detection. Operating the vision processor to perform face detection instead of motion detection would require even more power (e.g., 25 mW in addition to 10 mW for the camera). While the motion detection operation may use less power than the face detection operation, the power consumption may be too great (e.g., it may not allow for nine hours of battery life for the computing device).

Disclosed aspects address the issues above by providing triggering for an always-on vision system. Instead of using the camera and the vision processor in a motion detection mode to wake up the computing device, in aspects lower-powered sensors (e.g., an accelerometer or proximity sensor) may be used to trigger the always-on vision. A sensor hub may be used as the trigger for always-on vision, reducing the standby power consumption to 2 mW for always-on functionality.

Feature and advantages of the disclosed aspects include automatic user-adaptive triggering of the always-on vision system. Instead of the sensor hub using only fixed logic to trigger always-on vision, disclosed aspects provide a closed loop adaptive vision triggering solution. As further described below, when the sensors are used to trigger always-on vision, the immediate result from the always-on vision algorithm (e.g., whether a face is detected or not) is automatically used to accumulate a labeled training dataset for an incremental user behavior training model.

Providing a model based on the user's behavior improves accuracy and reduces battery consumption compared to always-on vision triggering using just a fixed logic model. The fixed logic model may be too strict and miss triggering events (e.g., it is less accurate) or it may be too loose (e.g., the always-on trigger is a false positive, wasting battery). As further described below, the result of the fixed model may be fused or combined with the result of the user behavior model in order to determine a final decision for always-on triggering. Combining the fixed model and the user behavior model may further improve accuracy and power reduction compared to using the user behavior model alone as the user behavior model may become overfit (e.g., if it is based on one user's data). Automatic user adaptive triggering for always-on vision is described in further detail below.

As mentioned above, a computing device may include components in order to provide always-on vision. Always-on vision may allow for the computing device to preemptively wake (e.g., load the operating system, user interface, and or software applications into memory) from a standby mode such that the system is ready for the user.

FIG. 1 shows a diagram of a computing device 110, according to an aspect of the present disclosure. The computing device includes a central processing unit (CPU) 111. The CPU 111 comprises circuitry for processing data and executing instructions. The CPU 111 includes a sensor hub 112 that is integrated in the CPU 111. For example, the sensor hub 112 may be a co-processor of the CPU 111. The sensor hub 112 may off-load sensor processing from the main processors of the CPU 111 in order to reduce power consumption and improve performance.

The computing device 110 also includes one or more sensors 113. The sensors 113 may be used to trigger always-on vision as described herein. The sensors 113 may include one or more of an accelerometer, a proximity sensor, a user gesture sensor, and any other sensor used to detect presence or motion of a user. The sensor hub 112 may be configured to receive raw data from the sensors 113 and extract sensor features from the sensors 112. For example, the sensor hub 112 may be configured to extract sensor features such as an angle of the computing device 110, the angle of the computing device 110 one second ago, the angle of the computing device 110 two seconds ago, the motion state (e.g., the computing device 110 is moving or not moving), the motion state one second ago, the motion state two seconds ago, the motion stability (e.g., variance of accelerometer), the motion stability one second ago, the motion stability two seconds ago, the proximity state (e.g., is a person or object proximate or near to the sensor), the proximity state one second ago, the proximity state two seconds ago, and a pick-up gesture (e.g., the computing device 110 was picked up or the computing device 110 has not been picked up). The extracted features may be applied to a model in order to determine whether or not to trigger always-on vision or not, as further described below.

The computing device 110 also includes storage 114. The storage 114 may be random access memory (RAM), read only memory (ROM), a hard drive, a magnetic disk, an optical disk, flash or other non-volatile memory, or any other medium from which a computer can read, for example. The features extracted from the raw sensor data may be stored in the storage 114 as further described below. The storage 114 may also store labeled training data as described herein.

The computing device 110 also includes a vision processor 115. The vision processor 115 may be configured to perform motion detection and face detection as described herein for awake-on-face functionality. The vision processor 115 may operate as a discrete companion chip to the CPU 111. The computing device 110 also includes a camera 116. The camera 116 may include an imaging sensor and image processor. The camera 116 may be configured to generate images or frames for use by the vision processor 115 in motion detection and face detection. The vision processor 115 may be configured to analyze images received from the camera 116 to detect a face in the images. The result of the vision processor 115 analyzing images from the camera 116 may be used to label the corresponding sensor features extracted from the sensor data. Further description and examples of sensor features are provided below. The label may be "0" when a face is not detected and "1" when a face is detected, for example. The label for the always-on vision result corresponding to the sensor features that triggered always-on vision may be used as training data for automatically generating an adaptive user behavior model as further described below. The user behavior model may be combined with a fixed model in order to determine whether extracted sensor features should trigger always-on vision or not.

Figure 2:
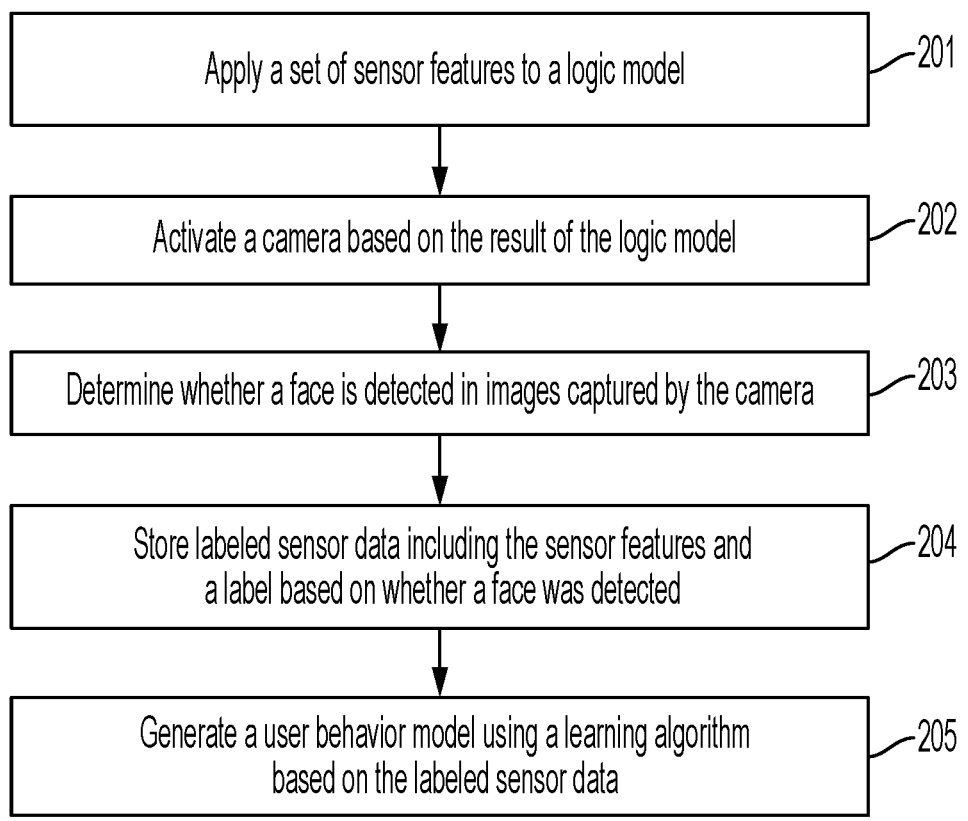
FIG. 2 shows a flowchart of a method for automatic user adaptive triggering, according to an aspect of the present disclosure.

FIG. 2 shows a flowchart of a method for automatic user adaptive triggering, according to an aspect of the present disclosure. The method may be implemented by a computing device as described herein, for example. At 201, the method applies a first set of sensor features to a logic model. The logic model may be a fixed logic model. The first set of sensor features may be determined using first raw sensor data from one or more sensors. The sensors may include an accelerometer, proximity sensor, or gesture detector, for example.

At 202, the method activates a camera based on a first result of the logic model. That is, the camera may become active after having been in a standby or idle mode. In some aspects, the activation of the camera may also be based on a user behavior model. In some aspects, the method includes determining a final result based on a combination of the result of the logic model and the result of the user behavior model. In such aspects the camera may be activated based on the final result. In some aspects, a weight may be determined based on an amount of stored training data. In such aspects, the weight may be applied to the two results such that the user behavior model is weighted more than the logic model (e.g., the fixed logic model) as more labeled training data is stored. For example, the weight may be increased by a predetermined amount for each minute of training data.

At 203, the method determines whether a face is detected or a face is not detected in a first set of images captured by the camera. The images may have been captured when the camera was active. A label may be determined based on whether the face was detected or not and this label may be stored with the sensor features and used as training data for generating the user behavior model.

At 204, the method includes storing first labeled sensor data. The labeled sensor data includes the first set of sensor features and a first label determined based on whether a face is detected or a face is not detected in a first set of images captured by the camera.

At 205, the method includes generating a user behavior model using a learning algorithm based on the first labeled sensor data. The user behavior model may usable for determining whether to the activate the camera based on a particular set of sensor features. Other labeled sensor data may be used to update the user behavior model over time such that it adapts to the user's behavior. In some aspects, the method may include storing second labeled sensor data including the second set of sensor features and a second label. The second label may be determined based on whether a face is not detected or a face is detected in a second set of images captured by the camera. Such aspects may further include updating the user behavior model using the second labeled sensor data.

In some aspects, the sensor features may only be stored for use as training data if they are new or different from the historical sensor data already stored by the computing device. In such aspects, the method may further include determining a difference between the first set of sensor features and historical sensor features. In such aspects, the storing of the first labeled sensor data may be based on the difference is above the threshold. In some aspects, the determination of the difference between the set of sensor features and historical sensor features may be based on a k-nearest neighbors (KNN) distance.

The user adaptive triggering for always-on vision described herein is advantageous because it is automatically performed in a closed loop without requiring intervention or feedback by the user. In the closed loop, the always-on vision result obtaining after triggering the camera is used to label the sensor features that were the cause of the triggering of the camera based on the fixed model and the user behavior model. This labeled data can be used for incremental training using an incremental learning algorithm such as the k-nearest neighbors (KNN) algorithm. Thus, the always-on vision triggering automatically adapts to the user's behavior as the user behavior model is updated over time based on more and more training data. Thus, the accuracy of the always-on triggering improves, reducing false positives (e.g., activating the always-on vision when there no face is detected), which wastes power. The closed loop user adaptive triggering solution is further described below.

Figure 3:
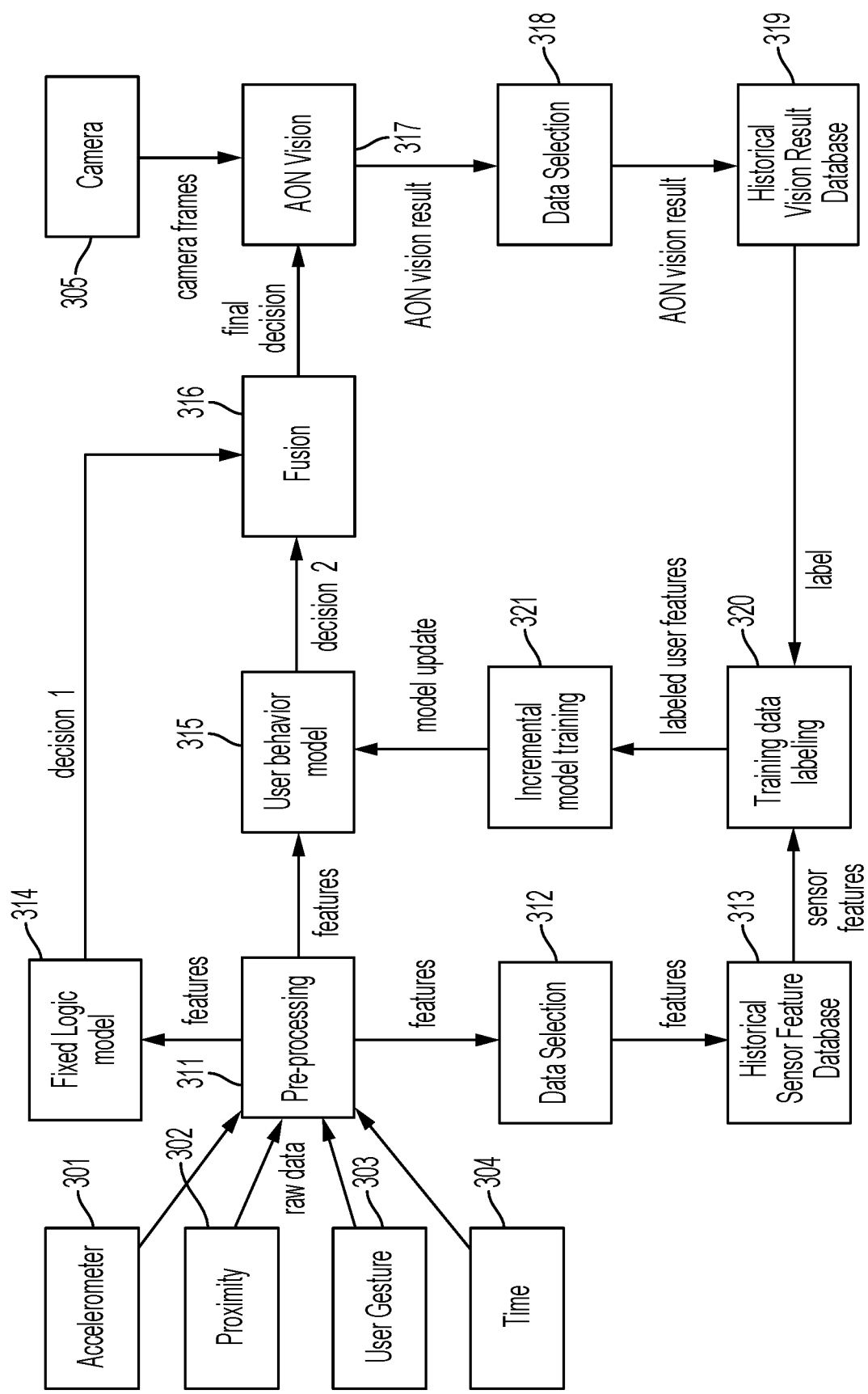
FIG. 3 shows a diagram of a process for trigging always-on vision using an incremental training model, according to an aspect of the present disclosure.

FIG. 3 shows a diagram of a process for trigging always-on vision using an incremental training model, according to an aspect of the present disclosure. The process of FIG. 3 may be implemented by a computing device (e.g., a laptop, tablet, or smart phone) as described herein.

As described herein, one or more sensors may be used to detect a user such that the vision processor does not have to waste power running in a motion detection mode or a face detection mode. These sensors may include an accelerometer, a proximity sensor, and a user gesture sensor, for example. The sensor data from the sensors may be provided to a sensor hub of a CPU, for example. The input context data, or raw sensor data, from the sensors may include accelerometer data 301, proximity data 302, user gesture data 303, and time data 304, for example.

The sensor data may be analyzed by a pre-processing module 311. The pre-processing module 311 may be part of a sensor hub, for example. The pre-processing module 311 may receive raw sensor data and perform feature extraction. The sensor features may refer to any information derived from the raw sensor data. For example, the sensor features may include an angle of the computing device, the angle of the computing device one second ago, the angle of the computing device two seconds ago, the motion state (e.g., the computing device is moving or not moving), the motion state one second ago, the motion state two seconds ago, the motion stability (e.g., variance of the accelerometer), the motion stability one second ago, the motion stability two seconds ago, the proximity state (e.g., is a person or object proximate or near to the sensor), the proximity state one second ago, the proximity state two seconds ago, and a pick-up gesture (e.g., the computing device was picked up or the computing device has not been picked up).

The set of extracted sensor features are provided to a data selection module 312. The data selection module 312 may select only new or different sensor features for storage in a historical sensor feature database 313. The data selection module 312 may store only the new/different features in order to keep the historical sensor feature database 313 compact in size. Furthermore, "new" features may be used to improve the user behavior model 315 because they can enable the incremental learning algorithm (e.g., KNN) used in the incremental model training module 321 to learn new things that it did not know. In our implementation, we can simply use the KNN distance to tell whether a feature is "new" or not.

The set of extracted sensor features are applied to a fixed logic model 314 and a user behavior model 315. The fixed logic model 314 and the user behavior model 315 may be used to make a triggering decision. In some aspects, the sensor hub uses the fixed logic model 314 and the user behavior model and performed the triggering decision making. The fixed logic model 314 may be a default model intended to cover or apply to a wide range of users. The fixed logic model 314 may be used as a starting point before acquiring training data. The fixed logic model 314 (e.g., the default model) may be a state machine algorithm. The state machine algorithm may use a pre-defined threshold for determining whether to trigger always-on vision based on the input set of sensor features. User behavior model 315 is the device user's personal model based on the device user's own data. The training data for generating the user behavior model 315 is obtained through use of the computing device. The user behavior model 315 may be an incremental growing k-nearest neighbor (KNN) database, for example. The user behavior model 315 may be another type of incremental personalized model in other aspects (e.g., a neural network).

A fusion module 316 obtains and combines the decision result (e.g., a decision to trigger always-on vision or not) from both the fixed logic model 314 and the user behavior model 315. In some aspects, the fusion module 316 functionality may be performed by the sensor hub described herein. The fusion module determines a final decision that is used to trigger always-on vision or not. The final decision may be determined based on a KNN distance and a KNN result confidence may be 0, 0.25, 0.5, 0.75, or 1, for example. In some aspects, the fixed logic model confidence may be a fixed value of 0.8. In some aspects, the weight may be used to determine the final result. The weight may be set to 0.3 if the labeled training data is less than seven minutes, for example. The weight may be increased by 0.05 for every three and a half minutes of additional training data, for example. The maximum value of the weight may be 0.8. Based on the weight, the fixed logic confidence (fixed_conf), and the user behavior model confidence (user_conf), the fused trigger confidence (fused_conf) may be determined according to equation 1 below:

$$\text{fused}_{conf} = (1-\text{weight})*\text{fixed}_{conf} + \text{weight}*\text{user}_{conf} \quad (1)$$

The output result (e.g., the fused trigger confidence) of the fusion module 316 is used to trigger an always-on vision algorithm performed by always-on (AON) module 317. The triggering of always-on vision may be determined by comparing the output result of the fusion module 316 to a threshold value. Always-on algorithm is merely an example name. The present disclosure does not limit the functioning of the module to be always on, but may also be on almost always or some time or not at all. The AON module 317 functionality may be performed by the vision processor described herein. A camera 305 may be activated in response to the triggering of always-on vision. Prior to its activation, the camera may have been in a standby mode. Images or camera frames captured by the camera are provided to the AON vision module 317. The images are processed by the AON module 317 to determine whether a face is detected in the images. The result of the AON vision module 317 is looped back as input for incremental training to improve model performance.

The AON vision result (e.g., an indicator of whether the face was detected or not detected) is provided to a data selection module 318. The data selection module 318 determines whether to store the always-on vision result received from the AON vision module 317 in a historical vision result database 319. The storage decision making performed by the data selection module 318 may be similar to the operations of the data selection module 312 described above.

A training data labeling module 320 may generate labeled sensor data including the sensor features and the corresponding always-on vision result (e.g., the sensor features are labeled as having a face detected or not having a face detected). The labeled sensor data is used for the incremental learning performed by the incremental model training module 321. The incremental model training module 321 uses a learning algorithm (e.g., the k-nearest neighbor algorithm) to generate or update the user behavior model 315. The updated user behavior model 315 is then used to determine whether to trigger always-on vision, and so this creates a closed loop wherein the results of the AON vision algorithm are used to label the sensor features, which are used to train the user behavior model, which is used to trigger always-on vision using later sensor features, and so on.

As discussed herein, the automatic user adaptive triggering of always-on vision is advantageous because it improves the accuracy of the always-on triggering and reduces power consumption (e.g., by reducing false positives). The combining or fusing of the fixed logic model with the user adaptive model to determine a final result for triggering always-on vision further improves accuracy and further reduces power consumption since it improves upon the fixed model while preventing overfitting (which may happen using the user behavior model alone).

The advantages and improvements provided by the automatic user adaptive triggering solution described herein have been confirmed in experimental testing. Instead of a single person, a group of people were used for the test. A group of people were used instead of a single person as continuous repetition by one person may cause the detected motions and gestures to become unnatural overtime. The test dataset included hours of active usage data of the computing device, including the following use cases:

While sitting still on a seat, take the computing device from a pocket (e.g., jacket pocket, pants pocket, etc.) to use.

While standing still, take the computing device from a pocket to use.

While sitting still beside table, pick up the computing device from the table to use, where the device was face up, face down, and at other angles.

While standing still beside a table, pick up the computing device from the table to use (the computing device being face up, face down, and at other angles).

While walking, take the computing device from a pocket to use.

While walking with the computing device in hand, pick up and use the computing device.

While sitting on a bus, take the computing device from a pocket to use.

While sitting on a bus with the computing device in hand, pick up and use the computing device.

While running with the computing device in hand, pick up and use the computing device.

Uses cases as above but not using the computing device.

Figure 4:
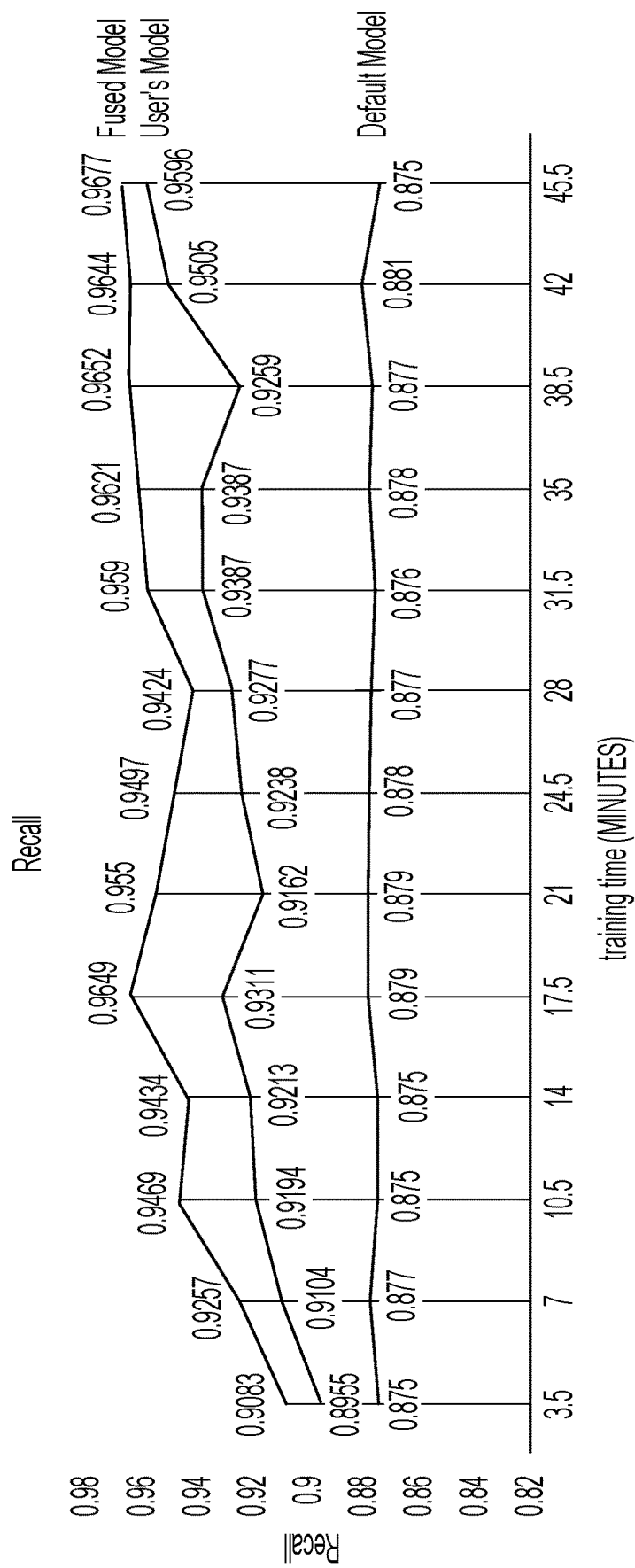
FIG. 4 shows a chart of recall for a test dataset over time for a default model, a user's model, and a fused model, according to an aspect of the present disclosure.
Figure 5:
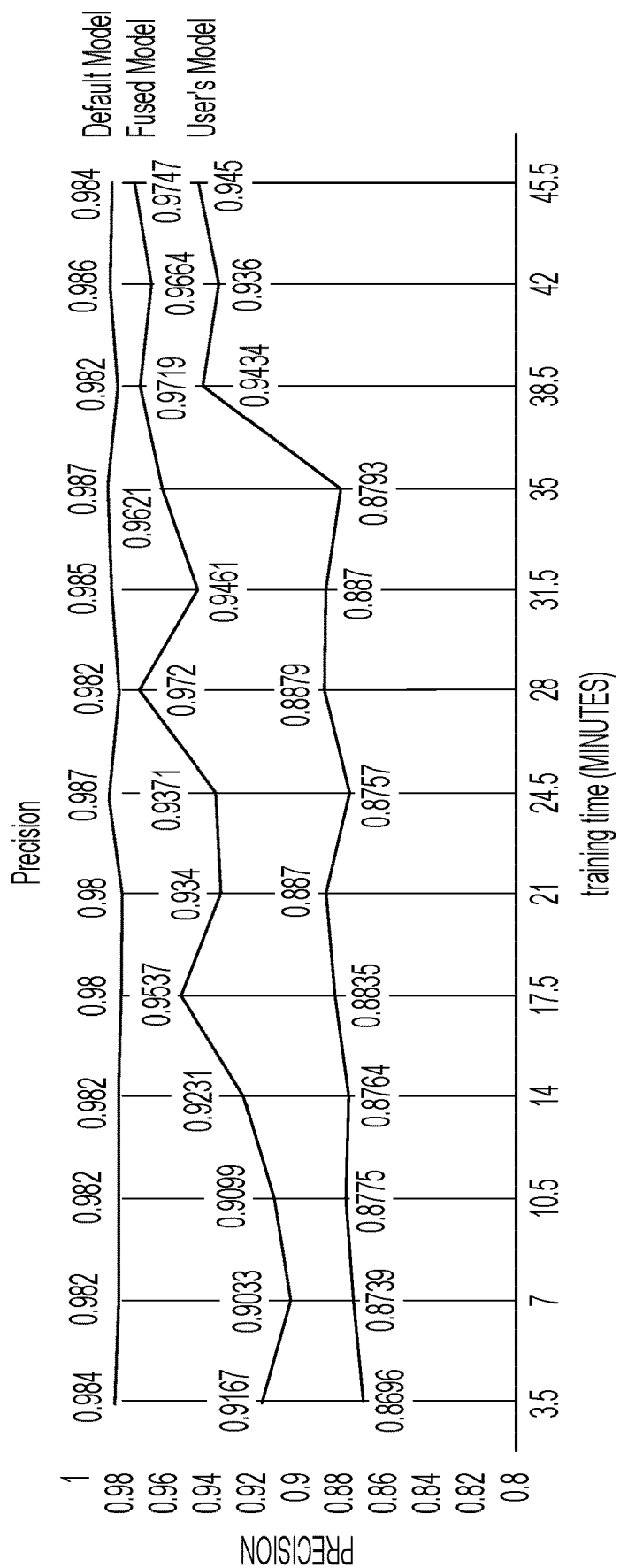
FIG. 5 shows a chart of precision for a test dataset over time for a default model, a user's model, and a fused model, according to an aspect of the present disclosure.

The results of the experimental tests are shown in FIG. 4 and FIG. 5. FIG. 4 shows a chart of recall for a test dataset over time for a fused model, a user's model, and a default model, according to an aspect. In FIG. 4, the top line charts the fused model results (e.g., a combination of the user behavior model and the fixed/default model), the middle line charts the user behavior model results, and the bottom line charts the default model results (e.g., fixed logic model results). FIG. 5 shows a chart of precision for a test dataset over time for a default model, a fused model, and a user's model, according to an aspect. The top line charts the default model results (e.g., the fixed logic model results). The middle line charts the fused model results (e.g., the combination or fusion of the default/fixed logic model results with the user behavior model results). The lower line charts the user behavior model results.

In the test, the fixed model result was flat across all tests and its precision was higher (98%) while recall was relatively lower (87%). "Precision" referring to the positive predictive value (e.g., the faction of relevant instances among retrieved instances). "Recall" referring to the sensitivity, true positive rate, or probability of detection (e.g., the fraction of the total amount of relevant instances that were actually received). In this test, the user behavior model (e.g., a KNN model) result increased as more data was used in training. At the end of the test the recall was 96% and the precision was 94%. The fused model performed even better since confidence (e.g., distance) from the k-nearest neighbors algorithm is taken into consideration and combined with the fixed logic model. In some test cases, the fixed model and user behavior model would trigger always-on vision while the fused model would not trigger always-on vision, which turned out to be the correct decision.

Thus, the systems and methods for automatic user adaptive triggering of always-on vision provides improved accuracy and reduced power consumption, which are further improved by combining or fusing the fixed logic model with the user behavior model. Features and advantages of the user adaptive triggering of always-on vision further include the ability for the computing device to be "always-ready" while still conserving enough power to last for a workday using current generation computer hardware. Furthermore, while the aspects above describe always-on vision, the systems and methods for automatic user adaptive triggering may be applied to other situations as well. For example, the automatic user adaptive triggering techniques described herein may be applied to hand detection or body detection algorithms (in addition to face detection as described herein). The systems and methods for automatic user adaptive triggering may also use different input sensors, such as a human presence sensor, location sensor, audio sensor, or another sensor usable for detection of a user. The systems and methods for automatic user adaptive triggering may also be used for human presence detection-based vision triggering. The systems and methods for automatic user adaptive triggering may also be used to adaptively suggest that certain software applications be opened based on audible key words (e.g., the user speaks about food or eating before opening a restaurant reviewing application).

Figure 6:
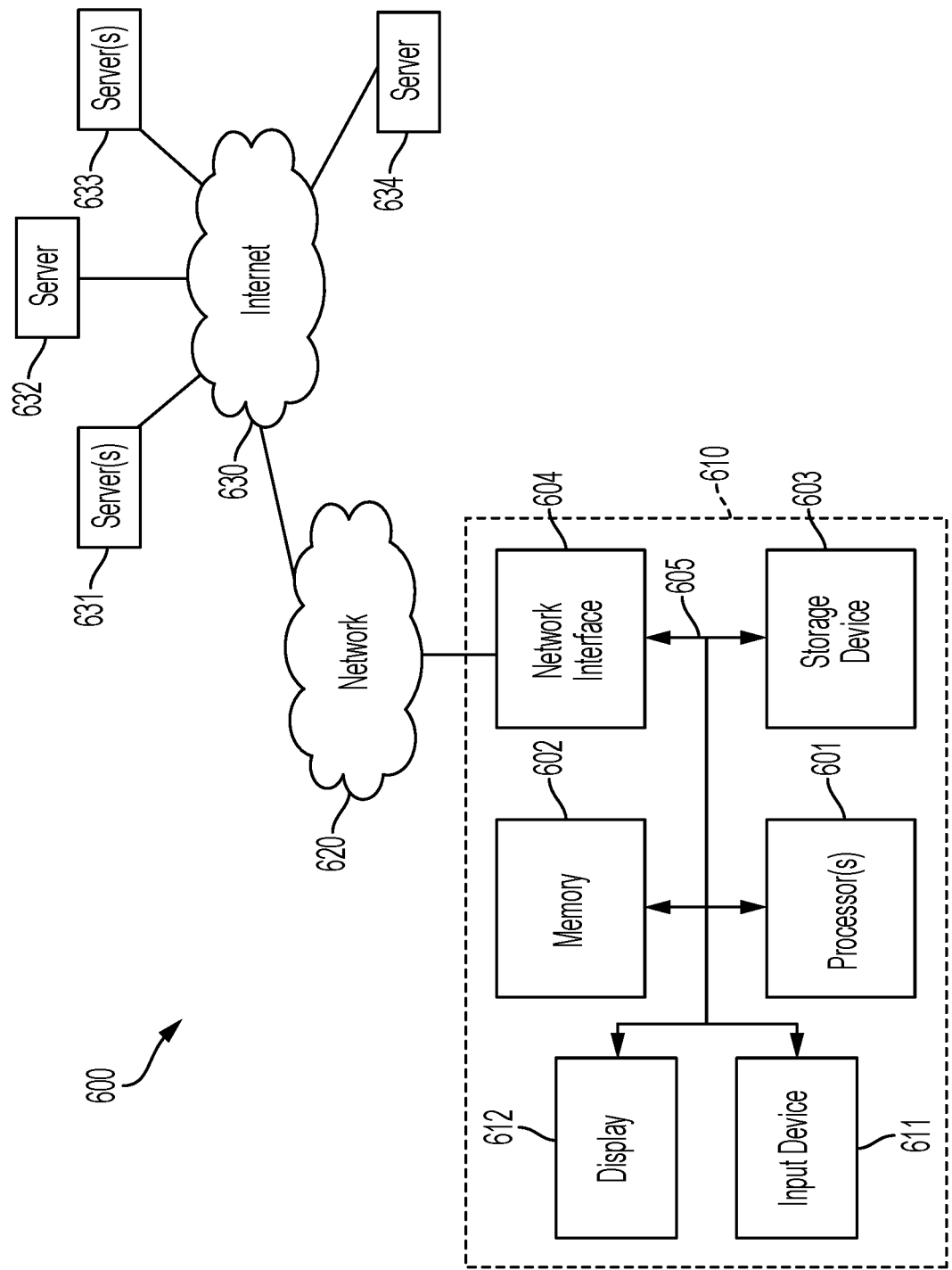
FIG. 6 shows a diagram of hardware of a special purpose computing machine for implementing systems and methods described herein.

FIG. 6 shows a diagram of hardware of a special purpose computing machine for implementing systems and methods described herein. The following hardware description is merely one example. It is to be understood that a variety of computer systems and topologies could be used to implement the above described techniques. The hardware shown in FIG. 6 may be used to implement the computing device providing always on vision triggering as described herein.

An example of a computer system 610 is illustrated in FIG. 6. The computer system 610 includes a bus 605 or other communication mechanism for communicating information, and one or more processor(s) 601 coupled with bus 605 for processing information. The computer system 610 may also include one or more non-transitory machine-readable media, such as a storage device or a memory. For example, the computer system 610 includes a memory 602 coupled to bus 605 for storing information and instructions to be executed by processor 601, including information and instructions for performing some of the techniques described above, for example. This memory may also be used for storing programs executed by processor(s) 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 603 may include source code, binary code, or software files for performing the techniques above, for example. Storage device and memory are both examples of non-transitory computer readable storage mediums.

The computer system 610 may be coupled via bus 605 to a display 612 for displaying information to a computer user. An input device 611 such as a keyboard, touchscreen, and/or mouse is coupled to bus 605 for communicating information and command selections from the user to processor 601. The combination of these components allows the user to communicate with the system. In some systems, bus 605 represents multiple specialized buses, for example.

The computer system also includes a network interface 604 coupled with bus 605. The network interface 604 may provide two-way data communication between computer system 610 and a network 620. The network interface 604 may be a wireless or wired connection, for example. The computer system 610 can send and receive information through the network interface 604 across a local area network, an intranet, a cellular network, or the Internet, for example. In the Internet example, a browser, for example, may access data and features on backend systems that may reside on multiple different hardware servers 631-634 across the network. The servers 631-634 may be part of a cloud computing environment, for example.

The following are exemplary implementations of the automatic user adaptive triggering techniques described herein.

One implementation of the automatic user adaptive triggering techniques described herein includes a computer system comprising one or more processors, a camera, one or more sensors, and machine-readable medium. The machine-readable medium being coupled to the one or more processors and storing computer program code comprising instructions executable by the one or more processors. The instructions being executable to activate the camera based on a first result of applying a first set of sensor features to a logic model, where the first set of sensor features are determined using first raw sensor data from the one or more sensors. The instructions being executable to store first labeled sensor data including the first set of sensor features and a first label determined based on whether a face is detected or a face is not detected in a first set of images captured by the camera. The instructions being executable generate a user behavior model using a learning algorithm based on the first labeled sensor data. The user behavior model may be usable for determining whether to the activate the camera based on a particular set of sensor features.

In some implementations, the computer program code is further configured to determine a second result of applying a second set of sensor features to the logic model. The second set of sensor features may be determined using second raw sensor data from the one or more sensors. In such implementations, the computer program code is further configured determine a third result of applying the second set of sensor features to the user behavior model, determine a final result based on a combination of the second result of the logic model and the third result of the user behavior model, and activate the camera based on the final result.

In some implementations, the computer program code is further configured to determine a weight based on an amount of stored training data. The determination of the final result may be based on the weight.

In some implementations, the computer program code is further configured to store second labeled sensor data including the second set of sensor features and a second label determined based on whether a face is not detected or a face is detected in a second set of images captured by the camera and update the user behavior model using the second labeled sensor data.

In some implementations, the computer program code is further configured to provide access to the computer system if a face is recognized in images provided by the camera.

In some implementations, the computer program code is further configured to determine a difference between the first set of sensor features and historical sensor features. The storing of the first labeled sensor data may be based on the difference is above the threshold.

In some implementations, the determination of the difference between the first set of sensor features and historical sensor features is based on a k-nearest neighbors distance.

In some implementations, the learning algorithm is the k-nearest neighbors algorithm.

Another implementation of the automatic user adaptive triggering techniques described herein includes one or more non-transitory machine-readable medium storing a program executable by at least one processing unit of a device. The program comprises sets of instructions for activating a camera based on a first result of applying a first set of sensor features to a logic model. The first set of sensor features being determined using first raw sensor data from one or more sensors. The program further comprises sets of instructions for storing first labeled sensor data including the first set of sensor features and a first label determined based on whether a face is detected or a face is not detected in a first set of images captured by the camera. The program further comprises sets of instructions for generating a user behavior model using a learning algorithm based on the first labeled sensor data. The user behavior model may be usable for determining whether to the activate the camera based on a particular set of sensor features.

In some implementations, the program further comprises sets of instructions for determining a second result of applying a second set of sensor features to the logic model, where the second set of sensor features is determined using second raw sensor data from the one or more sensors. In such implementations, the program further comprises sets of instructions for determining a third result of applying the second set of sensor features to the user behavior model, determining a final result based on a combination of the second result of the logic model and the third result of the user behavior model, and activating the camera based on the final result.

In some implementations, the program further comprises sets of instructions for determining a weight based on an amount of stored training data, wherein the determination of the final result is based on the weight.

In some implementations, the program further comprises sets of instructions for storing second labeled sensor data including the second set of sensor features and a second label determined based on whether a face is not detected or a face is detected in a second set of images captured by the camera, and updating the user behavior model using the second labeled sensor data.

In some implementations, the program further comprises sets of instructions for determining a difference between the first set of sensor features and historical sensor features, where the storing of the first labeled sensor data is based on the difference is above the threshold.

In some implementations, the determination of the difference between the first set of sensor features and historical sensor features is based on a k-nearest neighbors distance.

In some implementations, the learning algorithm is the k-nearest neighbors algorithm.

Another implementation of the automatic user adaptive triggering techniques described herein includes a computer-implemented method. The method includes activating a camera based on a first result of applying a first set of sensor features to a logic model, where the first set of sensor features is determined using first raw sensor data from one or more sensors. The method further includes storing first labeled sensor data including the first set of sensor features and a first label determined based on whether a face is detected or a face is not detected in a first set of images captured by the camera. The method further includes generating a user behavior model using a learning algorithm based on the first labeled sensor data, where the user behavior model may be usable for determining whether to the activate the camera based on a particular set of sensor features.

In some implementations, the method further includes determining a second result of applying a second set of sensor features to the logic model. The second set of sensor features may be determined using second raw sensor data from the one or more sensors. In such implementations, the method further includes determining a third result of applying the second set of sensor features to the user behavior model, determining a final result based on a combination of the second result of the logic model and the third result of the user behavior model, and activating the camera based on the final result.

In some implementations, the method further includes determining a weight based on an amount of stored training data, wherein the determination of the final result is based on the weight.

In some implementations, the method further includes storing second labeled sensor data including the second set of sensor features and a second label determined based on whether a face is not detected or a face is detected in a second set of images captured by the camera and updating the user behavior model using the second labeled sensor data.

In some implementations, the method further includes determining a difference between the first set of sensor features and historical sensor features, where the storing of the first labeled sensor data is based on the difference is above the threshold. In such implementations, the determination of the difference between the first set of sensor features and historical sensor features is based on a k-nearest neighbors distance.

The above description illustrates various aspects of the present disclosure along with examples of how these aspects may be implemented. The above examples should not be deemed to be the only aspects, and are presented to illustrate the flexibility and advantages of the particular aspects as defined by the following claims. Based on the above disclosure and the following claims, other arrangements, aspects, implementations and equivalents may be employed without departing from the scope of the present disclosure as defined by the claims.

As used herein, the terms "first," "second," "third," "fourth," "fifth," "sixth," "seventh," "eighth," "ninth," "tenth," etc., do not necessarily indicate an ordering or sequence unless indicated. These terms, as used herein, may simply be used for differentiation between different objects or elements.

The above description illustrates various aspects of the present disclosure along with examples of how these aspects may be implemented. The above examples should not be deemed to be the only aspects, and are presented to illustrate the flexibility and advantages of the particular aspects as defined by the following claims. Based on the above disclosure and the following claims, other arrangements, aspects, implementations and equivalents may be employed without departing from the scope of the present disclosure as defined by the claims.

What is claimed is:

1. A computer system, comprising:
   one or more processors;
   a camera;
   one or more sensors; and
   a machine-readable medium coupled to the one or more processors and storing computer program code comprising instructions executable by the one or more processors to:
      activate the camera based on a first result of applying a first set of sensor features to a logic model, the first set of sensor features being determined using first sensor data acquired via the one or more sensors;
      store first labeled sensor data including the first set of sensor features and a first label that is determined based on whether a face is detected or a face is not detected in a first set of images captured by the camera;
      generate a user behavior model using a learning algorithm based on the first labeled sensor data, the user behavior model being trained, using the first labeled sensor data as training data, to determine whether to subsequently activate the camera based on a particular set of sensor features.

2. The computer system of claim 1, wherein the computer program code, when executed by the one or more processors, further cause the one or more processors to:
   determine a second result of applying a second set of sensor features to the logic model, the second set of sensor features being determined using second sensor data from the one or more sensors;
   determine a third result of applying the second set of sensor features to the user behavior model;
   determine a further result based on a combination of the second result of the logic model and the third result of the user behavior model; and
   subsequently activate the camera based on the further result.

3. The computer system of claim 2, wherein the computer program code, when executed by the one or more processors, further cause the one or more processors to determine a weight based on an amount of stored training data,
   wherein the determining the further result is based on the weight.

4. The computer system of claim 2, wherein the computer program code, when executed by the one or more processors, further cause the one or more processors to:
   store second labeled sensor data including the second set of sensor features and a second label that is determined based on whether a face is not detected or a face is detected in a second set of images captured by the camera; and
   update the user behavior model using the second labeled sensor data.

5. The computer system of claim 2, wherein the computer program code, when executed by the one or more processors, further cause the one or more processors to:
   provide access to the computer system when a face is recognized in images provided by the camera.

6. The computer system of claim 1, wherein the computer program code, when executed by the one or more processors, further cause the one or more processors to:
   determine a difference between the first set of sensor features and historical sensor features,
   wherein the storing of the first labeled sensor data is based on the difference being above a threshold.

7. The computer system of claim 6, wherein the determining the difference between the first set of sensor features and historical sensor features is based on a k-nearest neighbors distance.

8. The computer system of claim 1, wherein the learning algorithm comprises a k-nearest neighbors algorithm.

9. The computer system of claim 1, wherein the computer program code, when executed by the one or more processors, further cause the one or more processors to:
   determine a further result of applying a second set of sensor features, which are determined using second sensor data acquired via the one or more sensors, to the logic model and to the user behavior model; and
   subsequently activate the camera based on the further result.

10. A non-transitory machine-readable medium configured to store a program executable by processing circuitry of a device, the program comprising instructions that, when executed by the processing circuitry of the device, cause the device to:
   activate a camera based on a first result of applying a first set of sensor features to a logic model, the first set of sensor features being determined using first sensor data from acquired via one or more sensors;
   store first labeled sensor data including the first set of sensor features and a first label that is determined based on whether a face is detected or a face is not detected in a first set of images captured by the camera; and
   generate a user behavior model using a learning algorithm based on the first labeled sensor data, the user behavior model being trained, using the first labeled sensor data as training data, to determine whether to subsequently activate the camera based on a particular set of sensor features.

11. The non-transitory machine-readable medium of claim 10, wherein the program further comprises instructions that, when executed by the processing circuitry of the device, further cause the device to:
   determine a second result of applying a second set of sensor features to the logic model, the second set of sensor features being determined using second sensor data from the one or more sensors;
   determine a third result of applying the second set of sensor features to the user behavior model;
   determine a further result based on a combination of the second result of the logic model and the third result of the user behavior model; and
   activating the camera based on the further result.

12. The non-transitory machine-readable medium of claim 11, wherein the program further comprises instructions that, when executed by the processing circuitry of the device, further cause the device to:
   determine a weight based on an amount of stored training data, wherein the determination of the further result is based on the weight.

13. The non-transitory machine-readable medium of claim 11, wherein the program further comprises instructions that, when executed by the processing circuitry of the device, further cause the device to:
store second labeled sensor data including the second set of sensor features and a second label that is determined based on whether a face is not detected or a face is detected in a second set of images captured by the camera; and
update the user behavior model using the second labeled sensor data.

14. The non-transitory machine-readable medium of claim 10, wherein the program further comprises instructions that, when executed by the processing circuitry of the device, further cause the device to:
determine a difference between the first set of sensor features and a set of historical sensor features,
wherein the storing of the first labeled sensor data is based on the difference being above a threshold.

15. The non-transitory machine-readable medium of claim 14, wherein the determination of the difference between the first set of sensor features and the set of historical sensor features is based on a k-nearest neighbors distance.

16. The non-transitory machine-readable medium of claim 10, wherein the learning algorithm comprises a k-nearest neighbors algorithm.

17. A computer-implemented method, comprising:
activating a camera based on a first result of applying a first set of sensor features to a logic model, the first set of sensor features being determined using first sensor data from acquired via one or more sensors;
storing first labeled sensor data including the first set of sensor features and a first label that is determined based on whether a face is detected or a face is not detected in a first set of images captured by the camera; and
generating a user behavior model using a learning algorithm based on the first labeled sensor data, the user behavior model trained, using the first labeled sensor data as training data, to determine whether to subsequently activate the camera based on a particular set of sensor features.

18. The computer-implemented method of claim 17, further comprising:
determining a second result of applying a second set of sensor features to the logic model, the second set of sensor features being determined using second sensor data from the one or more sensors;
determining a third result of applying the second set of sensor features to the user behavior model;
determining a further result based on a combination of the second result of the logic model and the third result of the user behavior model; and
activating the camera based on the further result.

19. The computer-implemented method of claim 18, further comprising:
determining a weight based on an amount of stored training data,
wherein the determination of the further result is based on the weight.

20. The computer-implemented method of claim 18, further comprising:
storing a second labeled sensor data including the second set of sensor features and a second label determined that is based on whether a face is not detected or a face is detected in a second set of images captured by the camera; and
updating the user behavior model using the second labeled sensor data.

21. The computer-implemented method of claim 17, further comprising:
determining a difference between the first set of sensor features and a set of historical sensor features,
wherein the storing of the first labeled sensor data is based on the difference being above a threshold, and
wherein the determination of the difference between the first set of sensor features and the set of historical sensor features is based on a k-nearest neighbors distance.

* * * * *